United States Patent
Tseng et al.

(10) Patent No.: US 10,414,454 B2
(45) Date of Patent: Sep. 17, 2019

(54) DISTINGUISHING SYSTEM FOR SADDLE CONTACTING MODE

(71) Applicant: GIANT MANUFACTURING CO. LTD, Taichung Hsien (TW)

(72) Inventors: Wei-Han Tseng, Hsinchu (TW); Che-Wei Hsu, New Taipei (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 14/690,640

(22) Filed: Apr. 20, 2015

(65) Prior Publication Data

US 2015/0298752 A1    Oct. 22, 2015

(30) Foreign Application Priority Data

Apr. 21, 2014  (TW) ............................... 10311440 A

(51) Int. Cl.
| | |
|---|---|
| *B62J 1/00* | (2006.01) |
| *B62J 1/18* | (2006.01) |
| *B62J 1/26* | (2006.01) |

(52) U.S. Cl.
CPC ................ *B62J 1/007* (2013.01); *B62J 1/18* (2013.01); *B62J 1/26* (2013.01)

(58) Field of Classification Search
CPC ........ B62J 1/007; A61B 5/1078; A61B 5/107; A61B 5/1036
See application file for complete search history.

(56) References Cited

U.S. PATENT DOCUMENTS

| | | | | |
|---|---|---|---|---|
| 4,615,856 A | * | 10/1986 | Silverman | A61F 5/01 264/102 |
| 4,998,354 A | * | 3/1991 | Silverman | G01B 5/207 33/514.2 |
| 5,385,155 A | * | 1/1995 | Kittelsen | A61C 5/00 128/859 |
| 6,625,897 B2 | * | 9/2003 | Tadin | A43D 1/022 33/514.2 |
| 6,990,744 B2 | * | 1/2006 | Bieganek | A47C 7/021 33/514.2 |
| 2004/0232742 A1 | * | 11/2004 | Oehler | A61B 5/103 297/195.1 |
| 2006/0218809 A1 | * | 10/2006 | Bird | B62J 1/007 33/512 |
| 2009/0124935 A1 | * | 5/2009 | Staszak | A61B 5/107 600/587 |

(Continued)

*Primary Examiner* — David R Dunn
*Assistant Examiner* — Christopher E Veraa
(74) *Attorney, Agent, or Firm* — Finnegan, Henderson, Farabow, Garrett & Dunner, LLP

(57) ABSTRACT

A distinguishing system for a saddle contacting mode includes a saddle and a deformable pressure sensing apparatus. The deformable pressure sensing apparatus is disposed on the saddle, wherein the deformable pressure sensing apparatus deforms in response to a sitting pressure, and a saddle type is determined in accordance with the deformation. The deformable pressure sensing apparatus can actually acquire the pelvis contact shape. The deformation is visible on the saddle after the sitting pressure is released, and the deformation can be compared with a comparison table to determine the suitable saddle type for the user instantly. Therefore, the distinguishing system could save the test time and reduce the production cost.

15 Claims, 4 Drawing Sheets

(56) References Cited

U.S. PATENT DOCUMENTS

2009/0247909 A1* 10/2009 Mukumoto .............. A43B 7/28
600/592
2015/0150487 A1* 6/2015 Bigolin ................ A61B 5/1072
702/154

* cited by examiner

__DISTINGUISHING SYSTEM FOR SADDLE CONTACTING MODE__

RELATED APPLICATIONS

This application claims priority to Taiwan Application Serial Number 103114400, filed Apr. 21, 2014, which is herein incorporated by reference.

BACKGROUND

Technical Field

The present invention relates to a distinguishing system for saddle contacting mode. More particularly, the distinguishing system is used to determine a suitable saddle in accordance with a contacting mode between the saddle and a user's hip.

Description of Related Art

Bicycle riding can be relaxing and can strengthen the body. Thus, it has become one of the most popular leisure activities. However, during long rides, an inappropriate saddle will cause pain and be uncomfortable for a user's hip due to the fiction and pressure between the hip and the saddle.

One of the conventional methods for selecting a suitable saddle is to perform a static measurement of the ischium width. The first drawback of the static measurement is that only a point of ischium width is measured without considering that the contact during bicycle riding is an area. The second drawback of the static measurement is that the measuring result in a static condition is different from the measuring result during dynamic riding. That is, the pelvis will have different rotation degrees caused by different riding geometry. Moreover, the pelvis shapes are different among different users. Therefore, the widest point of the static measurement can only indirectly speculate the real contact mode. As such, the static measurement is ineffective.

Another method on selecting a suitable paddle is to classify a contact of the user in accordance with softness tests. Such a test has low relationship between the softness and the forward rotation of the pelvis during real bicycle riding. Finally, various prototype saddles can be tested or tried by a rider during bike riding. But such a selecting method is time-consuming, and an expression from various users about their feelings and the pressure distribution is not precise enough, so that it still not an accurate way of selecting a saddle with a rapid, effective and stably reproducible method.

SUMMARY

According to an embodiment of the present disclosure, a distinguishing system for a saddle contacting mode is provided. The distinguishing system for a saddle contacting mode includes a saddle and a deformable pressure sensing apparatus. The deformable pressure sensing apparatus is disposed on or integrated with the saddle, wherein the deformable pressure sensing apparatus deforms to form a simulated shape based on a sitting pressure, and a saddle type is determined in accordance with the simulated shape.

According to another embodiment of the present disclosure, a distinguishing system for a saddle contacting mode is provided. The distinguishing system for a saddle contacting mode comprises a saddle and a deformable pressure sensing apparatus disposed on the saddle. The deformable pressure sensing apparatus is configured to provide a deformation in response to a sitting pressure that is indicative of a saddle type and hold the deformation after removal of the sitting pressure.

BRIEF DESCRIPTION OF THE DRAWINGS

The present disclosure can be more fully understood by reading the following detailed description, with reference made to the accompanying drawings as follows.

DETAILED DESCRIPTION

Figure 1:
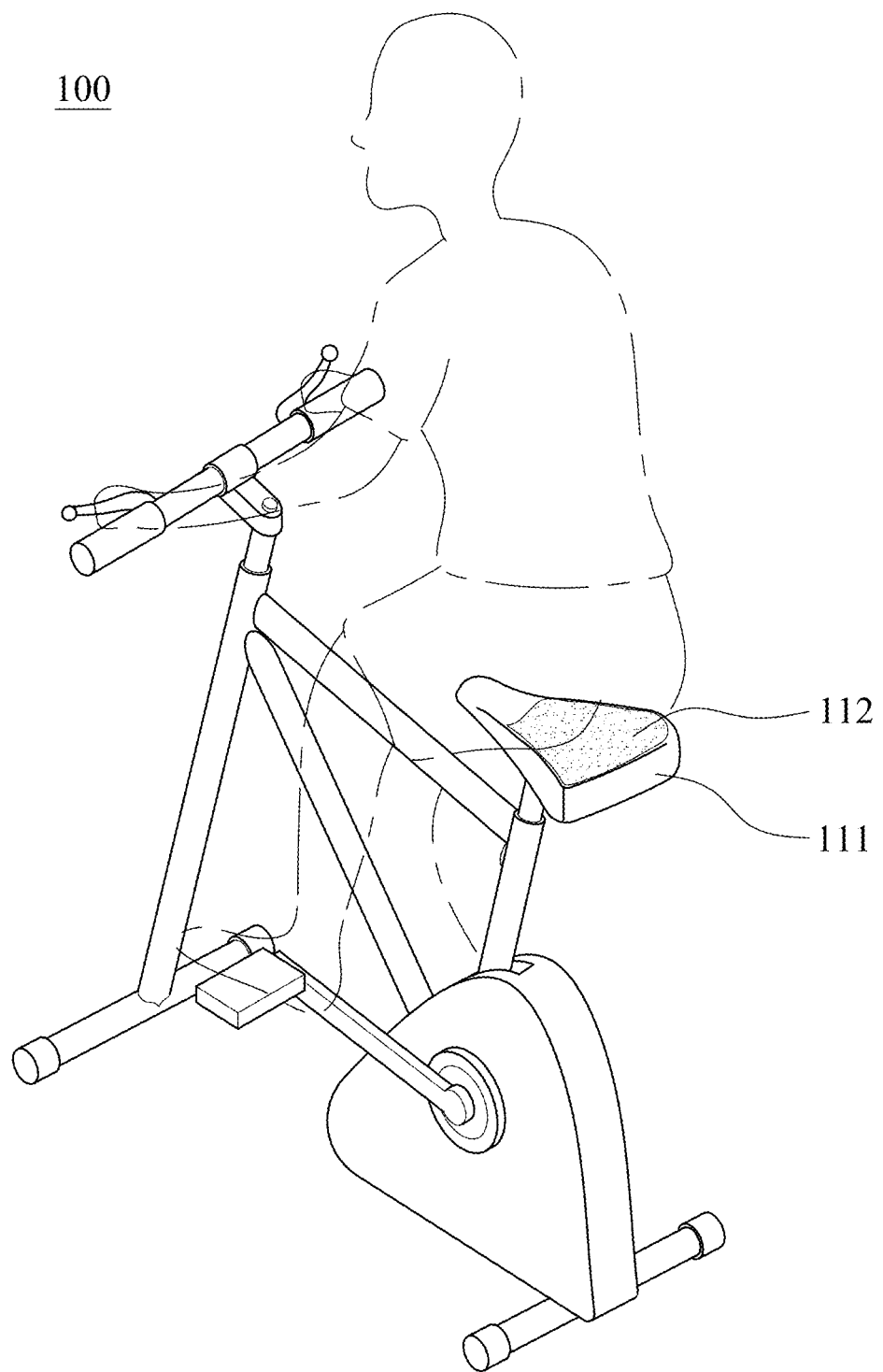
FIG. 1 is a perspective view of a distinguishing system for a saddle contacting mode according to one embodiment of the present disclosure.

FIG. 1 is a perspective view of a distinguishing system 100 for a saddle contacting mode according to one embodiment of the present disclosure. In FIG. 1, the distinguishing system 100 for a saddle contacting mode includes a saddle 111 and a deformable pressure sensing apparatus 112. The deformable pressure sensing apparatus 112 is symmetrically disposed on the saddle 112, wherein the deformable pressure sensing apparatus 112 deforms to form a simulated shape in response to a static sitting pressure from a user. The saddle 111 is installed on a stationary bicycle apparatus. The distinguishing system 100 further includes a comparison table. The comparison table includes a plurality of saddle types, and one of the saddle types is selected after analyzing the simulated shape and the comparison table.

Figure 2:
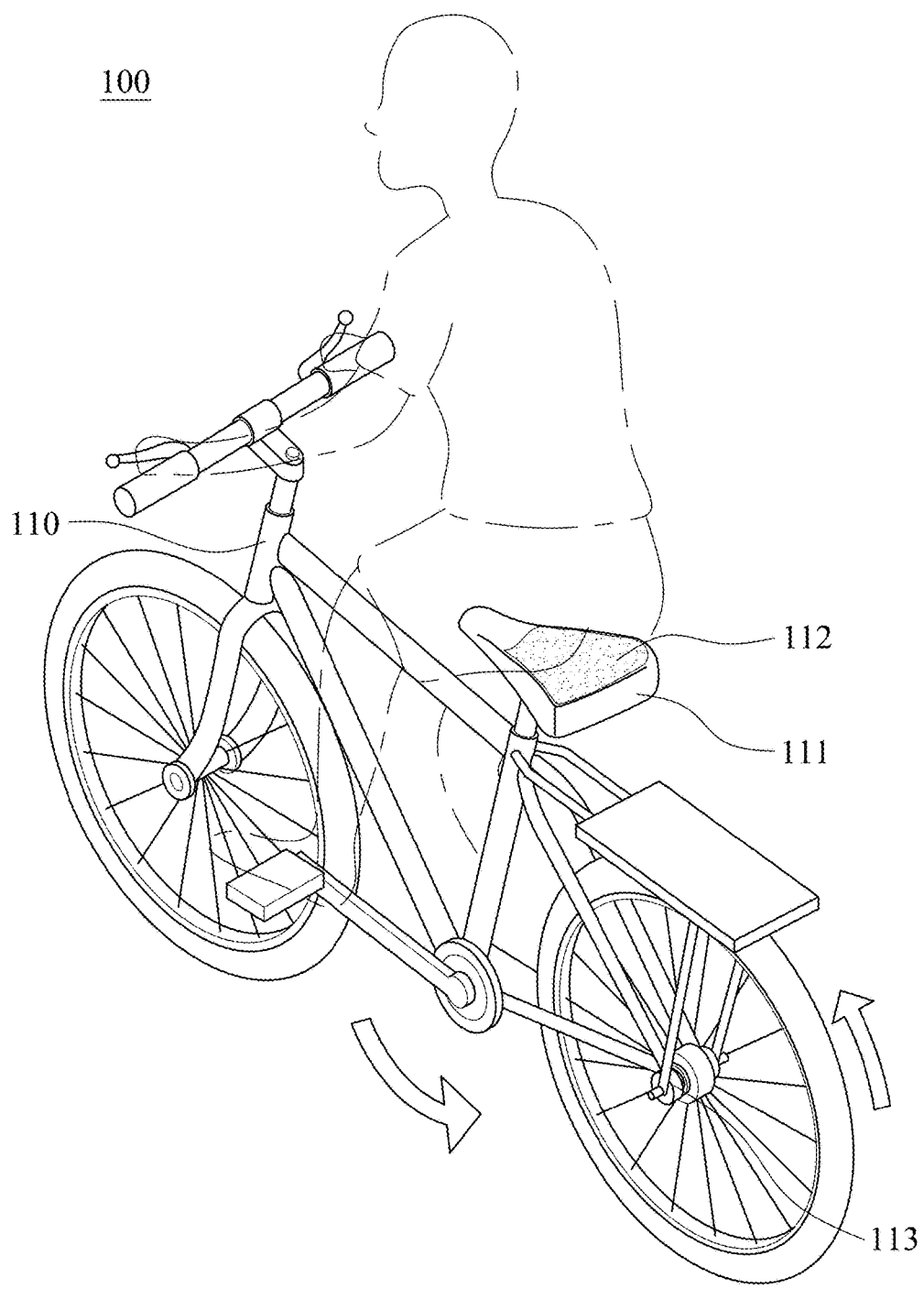
FIG. 2 is a perspective view of a distinguishing system for a saddle contacting mode according to another embodiment of the present disclosure.

FIG. 2 is a perspective view of a distinguishing system 100 for a saddle contacting mode according to another embodiment of the present disclosure. In FIG. 2, the distinguishing system 100 for a saddle contacting mode includes a bicycle 110, a saddle 111, and a deformable pressure sensing apparatus 112. The saddle 111 is installed on the bicycle 110. The deformable pressure sensing apparatus 112 is symmetrically disposed on the saddle 111. The deformable pressure sensing apparatus 112 is configured to provide a deformation, for example forming a simulated shape, in response to a sitting pressure when a user is riding. The distinguishing system 100 further includes a comparison table. The comparison table includes a plurality of saddle 111 types, and one of the saddle 111 types is selected after analyzing the simulated shape and the comparison table.

The aforementioned analyses of the simulated shape using the comparison table under a static situation or a riding situation is processed by visually observing the deformation (e.g. simulated shape), which is held after the rider gets up from the saddle. A saddle type adapting to the specific user is selected after analyzing the held deformation and the comparison table.

Figure 3:
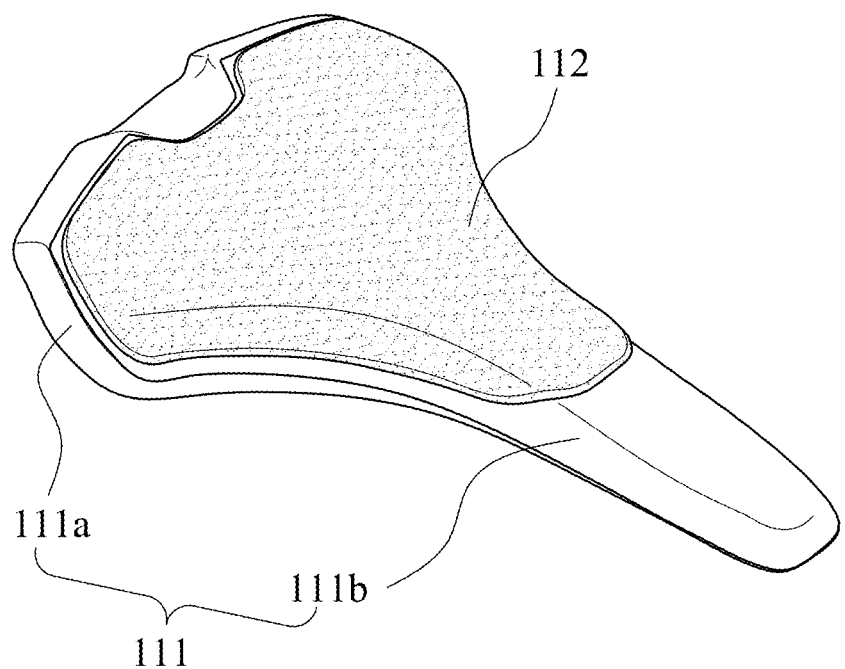
FIG. 3 is a perspective view of a deformable pressure sensing apparatus integrated with the saddle according to one embodiment of the present disclosure.
Figure 4A:
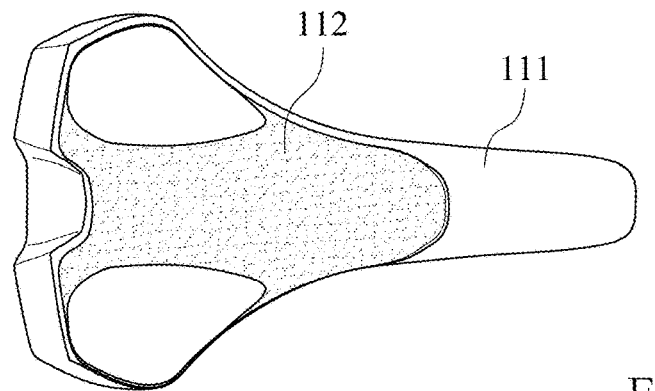
FIG. 4A is a top view of a simulated shape being a two-point shape according to one embodiment of the present disclosure.
Figure 4B:
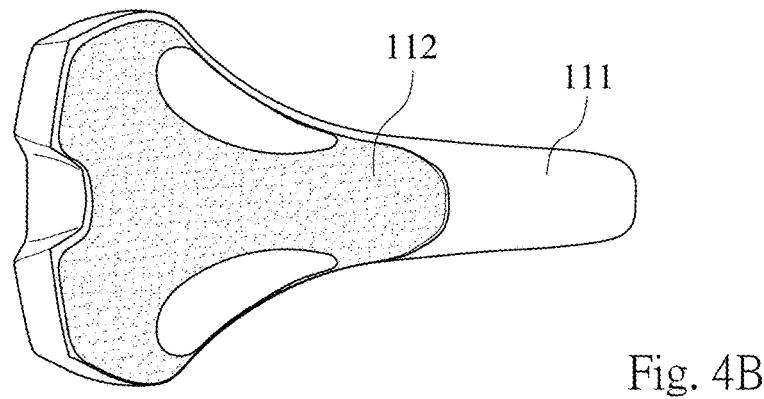
FIG. 4B is a top view of the simulated shape being symmetrical curved teardrops according to one embodiment of the present disclosure.
Figure 4C:
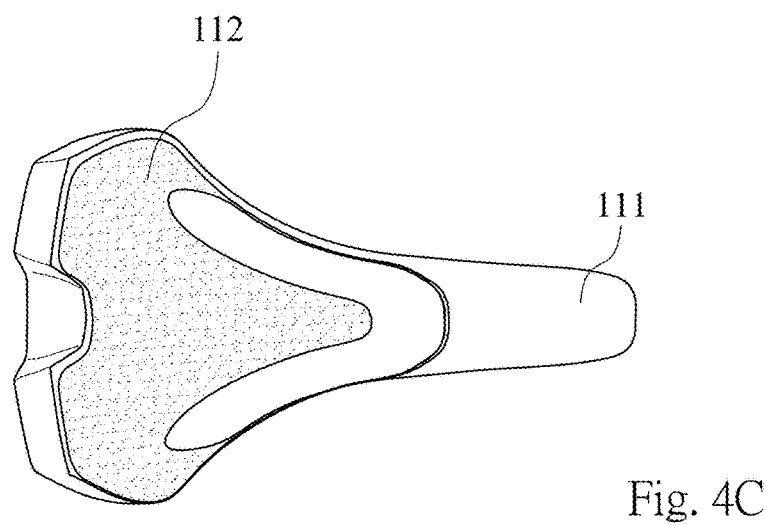
FIG. 4C is a top view of the simulated shape being a V-shape according to one embodiment of the present disclosure.

FIG. 3 is a perspective view of a deformable pressure sensing apparatus 112 disposed on the saddle 111 according to one embodiment of the present disclosure. FIG. 4A is a top view of a simulated shape being a two-point shape according to one embodiment of the present disclosure, FIG. 4B is a top view of the simulated shape with symmetrical curved teardrops according to one embodiment of the present disclosure, and FIG. 4C is a top view of the simulated shape with a V-shape according to one embodiment of the present disclosure. In FIG. 3 and FIGS. 4A-4C, the saddle 111 includes a body 111a and a skin 111b, and the deformable pressure sensing apparatus 112 is disposed on top of the skin 111b. The deformable pressure sensing apparatus 112 also can be disposed between the body 111a and the skin 111b. The skin 111b can be made of a transparent material in order to observe the deformation/simulated shape of the deformable pressure sensing apparatus 112 through the transparent skin.

FIG. 4A shows the top view of the simulated shape being a two-point shape. In FIG. 4A, the two-point shape is formed by the deformable pressure sensing apparatus 112 on the saddle 111 corresponding to a sitting pressure, and it represents that the back-half portion of the ischium of the user contacts with the deformable pressure sensing apparatus 112. FIG. 4B shows the top view of the simulated shape being symmetrical curved teardrops. The symmetrical curved teardrops is formed by the deformable pressure sensing apparatus 112 on the saddle 111 corresponding to a sitting pressure, and it represents that the front-half portion of the ischium of the user contacts with the deformable pressure sensing apparatus 112. FIG. 4C shows the top view of the simulated shape being a V-shape. The V-shape is formed by the deformable pressure sensing apparatus 112 on the saddle 111 corresponding to a sitting pressure, and it represents that the front-half portion of the ischium and the symphysis pubis of the user contact with the deformable pressure sensing apparatus 112.

The deformable pressure sensing apparatus 112 is a confined space. The deformable pressure sensing apparatus 112 is made of fluid material or shape memory material, and their characteristic is that they can deform to create a simulated shape in response to the real contact between the saddle 111 and the pelvis of the user when the user is statically sitting or dynamically riding.

In one example, the deformable pressure sensing apparatus 112 is made of fluid material. The fluid material (e.g. Grease) can be flowed, and when the sitting pressure is released, the fluid material will be formed as a simulated shape without immediately returning to its original shape.

In one example, the deformable pressure sensing apparatus 112 is made of shape memory material. The shape memory material is ceramic material or polymer material. The polymer material is thermotropic shape memory polymer, electrochromic shape memory polymer, light-induced shape memory polymer or chemically-induced shape memory polymer. The characteristic of the shape memory material is that it can form the simulated shape in accordance with the real contact between the saddle 111 and the pelvis of the user when the user is statically sitting or dynamically riding. When the sitting pressure is released, the shape memory polymer will not immediately reinstate its shape. The deformable pressure sensing apparatus 112 can be returned to its original shape using an external force (e.g. heat, electricity, light or chemical energy) before the next use.

The comparison table can be stored in desktop computer, laptop computer, tablet computer or other devices with computing power, wherein the comparison table includes various simulated shapes, various saddle types, and the corresponding relationship between the simulated shapes and the saddle types. In order to provide a convenient choice for the user, the corresponding relationship can be one simulated shape compared to one saddle type, one simulated shape compared to more saddle types or more simulated shapes compared to one saddle type. One simulated shape to one saddle type is preferable for providing a rapid and effective suggestion to select a saddle.

In one example, the simulated shape of the distinguishing system for a saddle contacting mode can be obtained through an electrical-classification saddle, thus the simulated shape can be showed in a screen.

To sum up, the distinguishing system for a saddle contacting mode of the present disclosure has the following advantages. (a). After the user's hip contacts the deformable pressure sensing apparatus 112, the simulated shape is formed by the sitting pressure. (b). Using the comparison table to determine the suitable saddle type can shorten the selecting time and improve the accuracy of selecting a saddle type. (c). Comparing with the conventional method which uses a pressure pad, the present disclosure can reduce the production cost. (d). The deformable pressure sensing apparatus 112 is disposed on the saddle 111, so that the deformable pressure sensing apparatus 112 can actually acquire the pelvis contact shape.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system for distinguishing saddles on a bicycle, comprising:
   a bicycle;
   a saddle having a shape; and
   a deformable pressure sensing apparatus disposed on the saddle, the deformable pressure sensor apparatus has a shape matching the shape of the saddle, the deformable pressure sensing apparatus is configured to provide a deformation shape in response to a sitting pressure after the bicycle is used dynamically, the deformable pressure sensing apparatus being configured to hold the deformation shape after removal of the sitting pressure; and
   a comparison table for determining a suitable saddle type based on the deformation shape, wherein the comparison table comprises a plurality of simulated shapes, a plurality of saddle types, and a plurality of corresponding relationships between the simulated shapes and the saddle types, wherein the plurality of simulated shapes comprises a two point shape, a symmetrical curved teardrops shape, and a v-shape.

2. The system of claim 1, wherein the comparison table comprises indications of the plurality of saddle types, each saddle type corresponding to a simulated shape.

3. The system of claim 1, wherein:
   the deformation shape is formed in response to sitting pressure and represents that a front-half portion of an ischium and a symphysis pubis of a user contact with the deformable pressure sensing apparatus.

4. The system of claim 1, wherein:
   the saddle comprises a body and a skin; and the deformable pressure sensing apparatus is disposed between the body and the skin.

5. A method for distinguishing saddles, comprising:
installing, a deformable pressure sensing apparatus disposed on the saddle of a bicycle, the deformable pressure sensor apparatus has a shape matching the shape of the saddle;
in response to sitting pressure from a rider applied to the saddle when the rider is dynamically riding the bicycle, deforming the deformable pressure sensing apparatus to create a deformation shape;
holding the deformation shape after removal of the sitting pressure after dynamically riding the bicycle;
comparing the deformation shape to items in a comparison table, the items in the comparison table including a plurality of simulated shapes, a plurality of saddle types, and corresponding relationships between the simulated shapes and saddle types, wherein the plurality of simulated shapes comprise a two point shape, a symmetrical curved teardrops shape, and a v-shape; and
determining a saddle type for the rider based on the comparison of the deformation shape to the items in the comparison table.

6. The method of claim 5, wherein the deformation shape is visible on the saddle after the sitting pressure is released and until a deformation cancellation force is applied to the pressure sensing apparatus.

7. A system for distinguishing saddles, comprising:
a bicycle saddle having an initial shape;
a deformable pressure sensing apparatus disposed on the bicycle saddle, the deformable pressure sensing apparatus is configured to provide a deformation in response to a sitting pressure on the bicycle saddle, the deformation forming a deformation shape, wherein the deformation is maintained until an external force is applied to return the bicycle saddle to the initial shape; and
a comparison table, wherein the comparison table comprises a plurality of simulated shapes, a plurality of saddle types, and a plurality of corresponding relationships between the plurality of simulated shapes and the plurality of saddle types, wherein the plurality of simulated shapes comprise a two point shape, a symmetrical curved teardrops shape, and a v-shape.

8. The system of claim 7, wherein:
the deformable pressure sensing apparatus is made of fluid material, wherein the fluid moves in response to the sitting pressure and when the sitting pressure is released the fluid material will be formed as the simulated shape without immediately returning to its original shape.

9. The system of claim 7, wherein:
the deformable pressure sensing apparatus is made of shape memory material that deforms in response to the sitting pressure and holds shape after removal of the sitting pressure.

10. The system of claim 7, wherein:
the saddle comprises a body and a skin; and
the deformable pressure sensing apparatus is disposed on top of the skin.

11. The system of claim 7, wherein:
the bicycle can be a two wheeled bicycle or stationary bicycle apparatus.

12. The system of claim 7, wherein:
the bicycle saddle comprises a body and a skin; and
the deformable pressure sensing apparatus is disposed between the body and the skin.

13. The system of claim 7, wherein:
the saddle comprises a body and a skin;
the deformable pressure sensing apparatus is disposed between the body and the skin; and
the skin includes transparent material in order to observe the deformation caused by the sitting pressure.

14. The system of claim 7, wherein the deformation represents that a front-half portion of an ischium and a symphysis pubis of a user contact with the deformable pressure sensing apparatus.

15. A method for distinguishing saddles, comprising:
installing a deformable pressure sensing apparatus on a saddle of a bicycle, the saddle having an initial shape and the deformable pressure sensor apparatus having a shape matching the initial shape of the saddle;
deforming the deformable pressure sensing apparatus to create a deformation shape in response to sitting pressure from a rider applied to the saddle when the rider is dynamically riding the bicycle;
holding the deformation shape after removal of the sitting pressure after dynamically riding the bicycle;
comparing the deformation shape to a plurality of simulated shapes, wherein the plurality of simulated shapes comprises a two point shape, a symmetrical curved teardrops shape, and a v-shape;
returning the deformable pressure sensing apparatus to the initial shape; and
determining a saddle type for the rider based on the comparison of the deformation shape to the plurality of simulated shapes.

* * * * *